F. L. MORSE.
METHOD OF CORRECTING THE PITCH IN DRIVE CHAINS.
APPLICATION FILED NOV. 10, 1919.
1,405,145.  Patented Jan. 31, 1922.
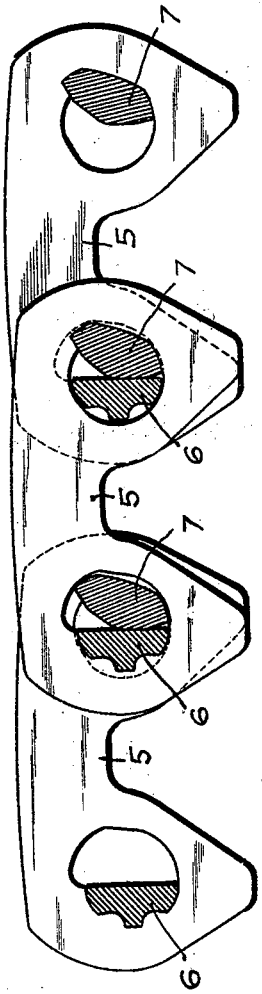
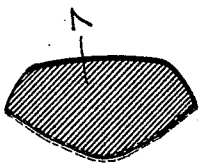
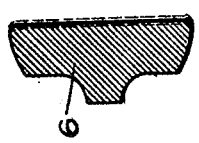
INVENTOR
Frank L. Morse.
by Edward H. Wright,
Atty.

UNITED STATES PATENT OFFICE.

FRANK L. MORSE, OF ITHACA, NEW YORK, ASSIGNOR TO THE MORSE CHAIN COMPANY, OF ITHACA, NEW YORK, A CORPORATION OF NEW YORK.

METHOD OF CORRECTING THE PITCH IN DRIVE CHAINS.

1,405,145. Specification of Letters Patent. Patented Jan. 31, 1922.

Application filed November 10, 1919. Serial No. 337,006.

*To all whom it may concern:*

Be it known that I, FRANK L. MORSE, a citizen of the United States, residing at Ithaca, in the county of Tompkins and State of New York, have invented a certain new and useful Method of Correcting the Pitch in Drive Chains, of which improvement the following is a specification.

This invention relates to a method of correcting the pitch of drive chains and particularly that form of chain composed of links formed of a plurality of plates connected together by multi-part pintles, such as two-part pintles, in which both parts extend through openings in the ends of the adjacent link plates and bear upon each other throughout the width of the chain.

In this well known standard form of chain it is important that the pitch should be maintained as accurately as possible, and for this purpose a standard schedule of dimensions as to the relative sizes and thicknesses of link plates and pintle parts is kept and followed in the manufacture and assembling of the chains. There is, however, some variation in the link plates, due to inaccuracy in punching and variation in the character or hardness of the metal stock from which the plates are punched, and this may result in slight variations in pitch as the chains are subjected to initial wear and the joint pins become seated in the openings of the respective links.

The object of my invention is to compensate for these variations and restore the chain to the correct pitch after such initial wear has taken place. This is accomplished by subjecting the assembled chain to such initial wear by running the same under tension for a period of time, then accurately measuring the pitch of the links to determine what the variation is, and then substituting for one of the pintle parts another of different thickness sufficient to restore the correct pitch of the chain.

In the accompanying drawing, Figure 1, is a longitudinal section showing several links of a standard form of chain; Fig. 2, a transverse section of one of the pintle parts, the seat pin, upon a larger scale, different thicknesses being indicated in dotted lines; and Fig. 3, a similar view of the other pintle part, termed the rocker.

While my improvement may be employed in connection with various forms of drive chains having multi-part pintles, I have illustrated the same in connection with a well known standard form of chain having links composed of a plurality of plates 5, which are formed by being punched out of sheet metal stock of the desired thickness in the usual way, and have openings of suitable size and shape punched in their ends for the pintle parts. As shown, the pintle is composed of two parts, a seat pin 6, and a rocker pin 7, both extending through the openings in the ends of the plates of adjoining links, and bearing upon each other throughout substantially the full width of the chain. The seat pin at each joint is held by the plates of one link while the rocker pin engages the plates of the adjoining link as the parts turn, one upon the other within the openings in the link plates.

The chains are first assembled with the standard size pintle parts for producing a theoretical correct pitch, but after being subjected to initial wear, it will be seen, that on account of the variations and inaccuracies above referred to, the pitch may be slightly changed. This inaccuracy may then be corrected by changing the thickness of one of the parts of the pintle, for instance, if, after initial wear, it should be found by accurate measurement that the pitch has lengthened, then a slightly thicker pintle part would be inserted or substituted for the one used, which would compensate for the variation and restore the correct pitch.

In practice the sizes of the pintle parts, as to the different thicknesses, vary from each other by one thousandth of an inch, so that even very slight inaccuracies may be corrected. This change may be made by substituting another seat pin or another rocker pin, or both, as preferred, but the correction is usually made by changing the rocker pin, as in the standard chain this pin is not fastened to washers at its ends, as is the seat pin.

It will now be apparent that by means of my improvement the variations in the metal stock of the link plates, and the inaccuracies of punching may be compensated for, and the drive chains restored to correct pitch.

Having now described my invention, what I claim as new and desire to secure by Letters Patent is:

1. The method of correcting the pitch in drive chains having multi-part pintles, which consists in assembling the links upon standard size pintles, then running the chain under tension for a period of time, then accurately measuring the pitch, and substituting for one of the pintle parts another of different thickness sufficient to restore the correct pitch of the chain.

2. The method of correcting the pitch of drive chains having two part pintles, comprising seat pin and rocker pin, which consists in subjecting the chain to wear in running, then accurately measuring the pitch, and then substituting for the seat pin a corresponding pin of different thickness.

In testimony whereof I have hereunto set my hand.

FRANK L. MORSE.